(12) United States Patent
Uchino et al.

(10) Patent No.: US 9,743,444 B2
(45) Date of Patent: Aug. 22, 2017

(54) COMMUNICATION APPARATUS, AND CONFIGURATION CONTROL METHOD

(71) Applicant: NTT DOCOMO, INC., Tokyo (JP)

(72) Inventors: Tooru Uchino, Tokyo (JP); Hideaki Takahashi, Tokyo (JP); Wuri Andarmawanti Hapsari, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 15/032,222

(22) PCT Filed: Oct. 28, 2014

(86) PCT No.: PCT/JP2014/078630
§ 371 (c)(1),
(2) Date: Apr. 26, 2016

(87) PCT Pub. No.: WO2015/064571
PCT Pub. Date: May 7, 2015

(65) Prior Publication Data
US 2016/0278149 A1 Sep. 22, 2016

(30) Foreign Application Priority Data
Oct. 31, 2013 (JP) ................................ 2013-227527

(51) Int. Cl.
*H04W 76/02* (2009.01)
*H04W 28/18* (2009.01)
(Continued)

(52) U.S. Cl.
CPC ......... *H04W 76/023* (2013.01); *H04W 4/008* (2013.01); *H04W 8/005* (2013.01);
(Continued)

(58) Field of Classification Search
CPC .................................................. H04W 76/023
See application file for complete search history.

(56) References Cited

U.S. PATENT DOCUMENTS 8,194,600 B2 * 6/2012 Nagaraja ............. H04W 76/023
370/329
2001/0036810 A1 11/2001 Larsen
(Continued)

FOREIGN PATENT DOCUMENTS

| JP | 2000-152343 A | 5/2000 |
| JP | 2001-292093 A | 10/2001 |

(Continued)

OTHER PUBLICATIONS

Office Action in counterpart Japanese Patent Application No. 2013-227527 issued on May 17, 2016 (9 pages).
(Continued)

*Primary Examiner* — Tuan H Nguyen
(74) *Attorney, Agent, or Firm* — Osha Liang LLP

(57) ABSTRACT

A communication apparatus configured to perform communication by radio with another communication apparatus based on a setting by configuration information, including: a storage unit configured to hold default configuration information; a transmission unit configured to transmit default configuration information held in the storage unit to the other communication apparatus; a reception unit configured to receive default configuration information from the other communication apparatus; and a control unit configured to perform setting for performing communication by radio with the other communication apparatus by the default configuration information.

5 Claims, 9 Drawing Sheets

(51) Int. Cl.
H04W 4/00 (2009.01)
H04W 8/00 (2009.01)
H04W 24/02 (2009.01)
H04W 92/18 (2009.01)

(52) U.S. Cl.
CPC ........... *H04W 24/02* (2013.01); *H04W 28/18* (2013.01); *H04W 92/18* (2013.01)

(56) References Cited

U.S. PATENT DOCUMENTS

| | | | |
|---|---|---|---|
| 2003/0202494 | A1 | 10/2003 | Drews et al. |
| 2004/0114521 | A1 | 6/2004 | Sugaya |
| 2006/0123122 | A1 | 6/2006 | Jung et al. |
| 2008/0031208 | A1 | 2/2008 | Abhishek et al. |
| 2010/0128695 | A1 | 5/2010 | Nagaraja |
| 2011/0096723 | A1* | 4/2011 | Aoyama ............ H04W 76/022 370/328 |
| 2012/0224509 | A1 | 9/2012 | Nagaraja |
| 2013/0308551 | A1 | 11/2013 | Madan et al. |
| 2014/0307611 | A1 | 10/2014 | Tesanovic et al. |
| 2015/0038136 | A1* | 2/2015 | Wu ..................... H04W 48/08 455/434 |
| 2016/0205714 | A1 | 7/2016 | Morita et al. |

FOREIGN PATENT DOCUMENTS

| | | |
|---|---|---|
| JP | 2003-229869 A | 8/2003 |
| JP | 2005-524280 A | 8/2005 |
| JP | 2008-510344 A | 4/2008 |
| JP | 2008-523657 A | 7/2008 |
| JP | 2009-545924 A | 12/2009 |
| JP | 2012-510206 A | 4/2012 |
| JP | 2012-178826 A | 9/2012 |
| JP | 2013-223196 A | 10/2013 |
| JP | 2014-207669 A | 10/2014 |
| JP | 2015-050529 A | 3/2015 |
| WO | 2006/016331 A1 | 2/2006 |
| WO | 2013/177179 A1 | 11/2013 |
| WO | 2015/005256 A1 | 1/2015 |

OTHER PUBLICATIONS

International Search Report issued in PCT/JP2014/078630 mailed on Jan. 27, 2015 (2 pages).
Written Opinion of the International Searching Authority issued in PCT/JP2014/078630 mailed on Jan. 27, 2015 (5 pages).
Qualcomm Incorporated; "Study on LTE Device to Device Proximity Services"; 3GPP TSG RAN Meeting #58, RP-122009; Dec. 7, 2012 (6 pages).
3GPP TS 36.331 V11.5.0; "3rd Generation Partnership Project; Technical Specification Group Radio Access Network; Evolved Universal Terrestrial Radio Access (E-UTRA); Radio Resource Control (RRC); Protocol specification (Release 11)"; Section 6.2.2, Section 6.3.2, Sep. 2013 (347 pages).
Office Action issued Oct. 18, 2016, in corresponding Japanese Patent Application No. 2013-227527 (with translation) (10 pages).
Extended European Search Report in counterpart European Patent Application No. 14858089.7, dated Oct. 17, 2016 (9 pages).
3GPP TR 22.803 V12.2.0; "3rd Generation Partnership Project; Technical Specification Group Services and System Aspects; Feasibility study for Proximity Services (ProSe) (Release 12)"; Jun. 28, 2013 (45 pages).

* cited by examiner

FIG.1
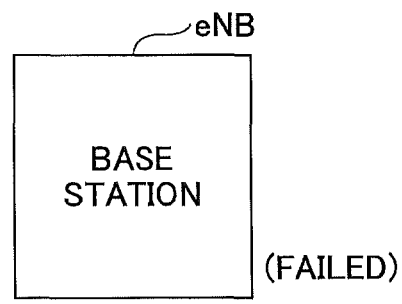
(FAILED)
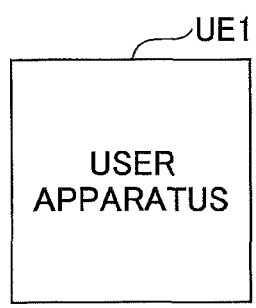
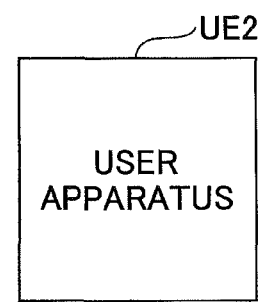

FIG.2

```
RRCConnectionReconfiguration-r8-IEs ::= SEQUENCE {
    measConfig                              MeasConfig                              OPTIONAL,  -- Need ON
    mobilityControlInfo                     MobilityControlInfo                     OPTIONAL,  -- Cond HO
    dedicatedInfoNASList                    SEQUENCE (SIZE(1..maxDRB)) OF
                                            DedicatedInfoNAS                        OPTIONAL,  -- Cond nonHO
    radioResourceConfigDedicated            RadioResourceConfigDedicated            OPTIONAL,  -- Cond HO-toEUTRA
    securityConfigHO                        SecurityConfigHO                        OPTIONAL,  -- Cond HO
    nonCriticalExtension                    RRCConnectionReconfiguration-v890-IEs   OPTIONAL   -- Need OP
}
...
```

FIG.3

```
RadioResourceConfigDedicated ::=    SEQUENCE {
  srb-ToAddModList                    SRB-ToAddModList          OPTIONAL,   -- Cond HO-Conn
  drb-ToAddModList                    DRB-ToAddModList          OPTIONAL,   -- Cond HO-toEUTRA
  drb-ToReleaseList                   DRB-ToReleaseList         OPTIONAL,   -- Need ON
  mac-MainConfig                      CHOICE {
    explicitValue                       MAC-MainConfig,
    defaultValue                        NULL
  }                                                             OPTIONAL,
  sps-Config                          SPS-Config                OPTIONAL,   -- Cond HO-toEUTRA2
  physicalConfigDedicated             PhysicalConfigDedicated   OPTIONAL,   -- Need ON
                                                                            -- Need ON
```

FIG.4

DEFAULT CONFIGURATION

| INDEX | VALUE OF EACH PARAMETER |
|---|---|
| 1 | PARAMETER A=X, PARAMETER B=Y, ····· |
| 2 | · · · · · |
| 3 | · · · · · |
| ⋮ | ⋮ |

COMMUNICATION APPARATUS, AND CONFIGURATION CONTROL METHOD

TECHNICAL FIELD

The present invention relates to D2D communication (device-to-device communication). More particularly, the present invention relates to a technique for performing D2D communication in an out-of-coverage area of a cell of a base station.

BACKGROUND ART

In mobile communication, it is common that a terminal (to be referred to as "user apparatus UE" hereinafter) and a base station eNB perform communication so that communication is performed between user apparatuses UE. However, in recent years, various techniques are considered on D2D communication for performing direct communication between user apparatuses UE (non-patent document 1, for example). When performing communication between user apparatuses UE, a user apparatus UE receives a discovery signal from another neighboring user apparatus UE so as to discover the user apparatus UE which becomes a communication partner of D2D, and to perform D2D communication with the user apparatus UE by performing connection setup and the like with the user apparatus UE.

By the D2D communication, it becomes possible to offload traffic between user apparatus UE-base station eNB, and to perform communication even when communication becomes unavailable in the base station eNB due to disaster and the like.

RELATED ART DOCUMENT

Non Patent Document

[NON PATENT DOCUMENT 1] 3GPP TSG RAN Meeting #58, RP-122009, 7 Dec. 2012

SUMMARY OF THE INVENTION

Problem to be Solved by the Invention

Like normal communication which is performed via a base station eNB, also in D2D communication, configuration information used for communication by a user apparatus UE is transmitted by a signaling from the base station eNB. By the way, "configuration" may be also referred to as "setting". In D2D communication, it is necessary to ascertain which configuration is used by the communication partner with each other between user apparatuses UE. As a configuration, for example, there is a setting of a bearer (transmission route of radio packets).

As environments where D2D communication is performed between user apparatuses UE, not only in-coverage of a cell formed by the base station eNB but also out-of-coverage are considered. It is desired that D2D communication can be performed even in an out-of-cell coverage area in consideration of a case where a base station eNB is failed due to disaster and the like.

However, since the user apparatus UE cannot receive a signaling from the base station eNB in out-of-cell coverage, the user apparatus UE cannot know which configuration to use when performing D2D communication. Thus, D2D communication cannot be performed in this situation.

The present invention is contrived in view of the above-mentioned points, and an object of the present invention is to provide a technique that enables D2D communication between user apparatuses even in an out-of-cell coverage.

Means for Solving the Problem

According to an embodiment of the present invention, there is provided a communication apparatus configured to perform communication by radio with another communication apparatus based on a setting by configuration information, including:

a storage unit configured to hold default configuration information;

a transmission unit configured to transmit default configuration information held in the storage unit to the other communication apparatus;

a reception unit configured to receive default configuration information from the other communication apparatus; and a control unit configured to perform setting for performing communication by radio with the other communication apparatus by the default configuration information.

Effect of the Present Invention

According to an embodiment of the present invention, there is provided a technique that enables D2D communication between user apparatuses even in an out-of-cell coverage.

BRIEF DESCRIPTION OF THE DRAWINGS

FIG. 1 is a whole block diagram of a communication system in the present embodiment;

FIG. 2 is a diagram showing RRC connection reconfiguration;

FIG. 3 is a diagram showing RadioResourceConfigDedicated;

FIG. 4 is an example of default configuration information;

EMBODIMENTS FOR CARRYING OUT THE INVENTION

Figure 5:
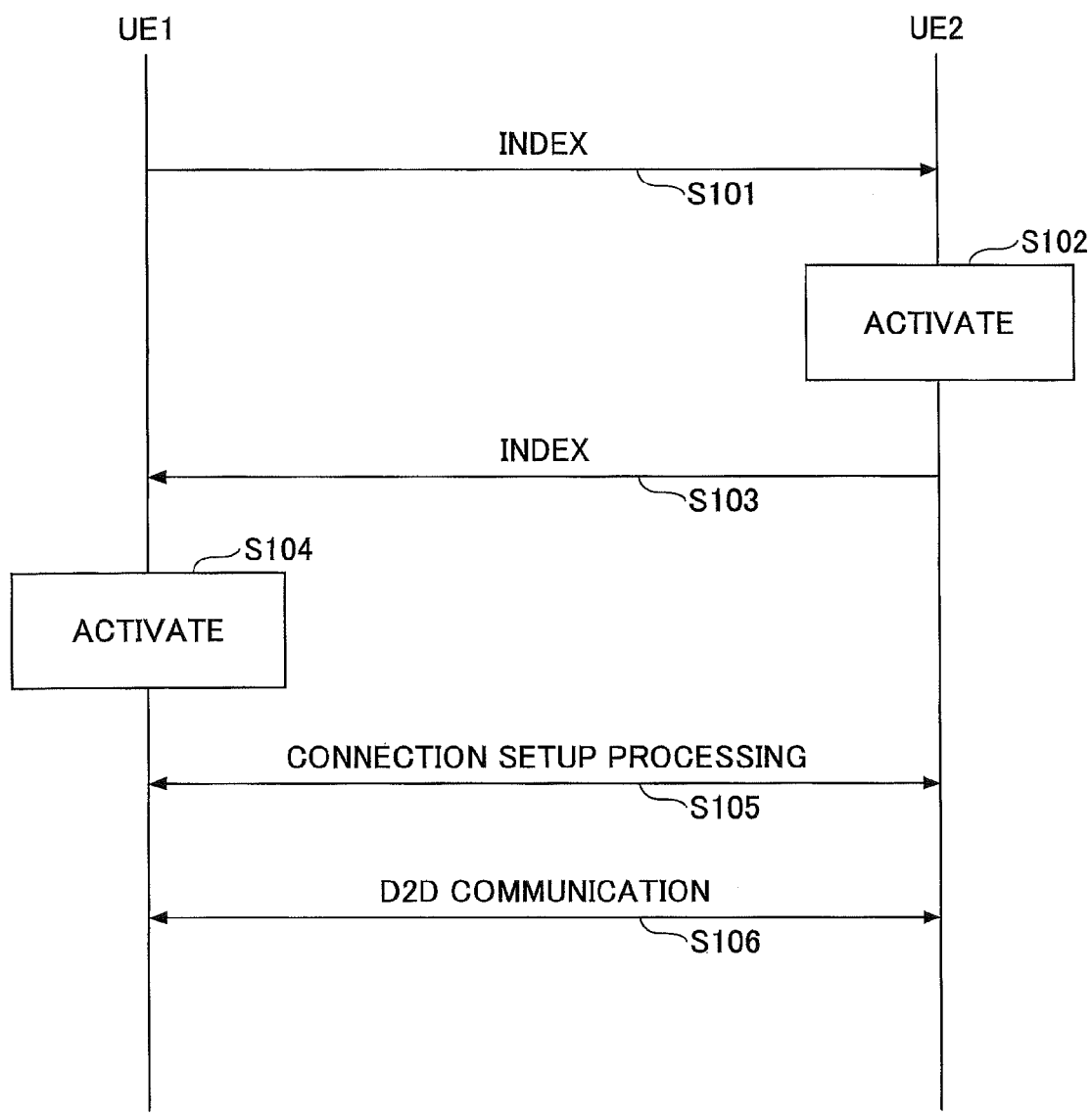
FIG. 5 is a sequence diagram for explaining an operation example 1.

In the following, embodiments of the present invention are described with reference to figures. The embodiments described below are merely examples, and the embodiments to which the present invention is applied are not limited to the embodiments below. For example, although the present embodiment presupposes a radio communication scheme complying with LTE in which radio interface protocols similar to radio interface protocols (RRC, PDCP, RLC, MAC, PHY) between UE-eNB are used in D2D communication between user apparatuses UE, the radio communication scheme to which the present invention is applied is not limited to such a scheme complying with LTE.

In the specification and the claims, the term "LTE" is used to mean not only a communication scheme corresponding to 3GPP release 8 or 9, but also a communication scheme corresponding to 3GPP release 10, 11, 12 or later release.

(System Whole Configuration, Operation Content)

FIG. 1 shows a whole configuration diagram of a communication system in the present embodiment. As shown in FIG. 1, the communication system in the present embodiment includes a user apparatus UE1 and a user apparatus UE2 for performing D2D communication. Although a base station eNB is shown in FIG. 1, the base station eNB is failed in the state shown in FIG. 1, for example, so that radio communication cannot be performed between the base station eNB and each user apparatus UE. In a case where the base station eNB is operating normally, the user apparatus UE1 is in-coverage of the cell formed by the base station eNB, but, the user apparatus UE2 is out-of-coverage.

Each user apparatus UE shown in FIG. 1 includes both of a function for performing general portable telephone network communication via a base station eNB and a D2D communication function. However, the present invention can be also applied to a user apparatus UE having only the D2D communication function. The D2D communication function includes a function for transmitting a discovery signal by a predetermined radio resource, and a function for receiving a discovery signal and performing radio connection setup processing (radio bearer setting and the like) with a user apparatus UE of a transmission source of the discovery signal so as to perform D2D communication, and the like. As a premise for performing the above-mentioned radio connection, it is necessary that the user apparatus UE1 and the user apparatus UE2 that perform D2D communication need to ascertain which configuration to use with each other.

In the present embodiment, each user apparatus UE that performs D2D communication holds configuration information for performing D2D communication, beforehand, as information of default configuration (which may be also referred to as special configuration).

<On Default Configuration>

In the present embodiment, the default configuration information is information that enables D2D communication between user apparatuses UE without receiving configuration information by the user apparatuses UE by a signaling from the base station eNB. Therefore, default configuration information held by each user apparatus UE in the present embodiment is basically the same as configuration information that is received from the base station eNB by a signaling for radio connection in a cell coverage.

However, it is not essential to hold all pieces of configuration information received from the base station eNB by a signaling for normal radio connection as default configuration information. For example, within pieces of configuration information received when the user apparatus UE is in-cell coverage, pieces of configuration information that can be also used for D2D communication in out-of-coverage may be used.

In the present embodiment, the information held by the user apparatus UE as default configuration information includes, for example, bearer information of PDCP/RLC/MAC and configuration information of PHY.

More specifically, in the present embodiment, default configuration information held by the user apparatus UE basically includes all or a part of pieces of information of IEs included in RRC connection reconfiguration of LTE (section 6.2.2 of 3GPP TS36.331 V11.5.0). FIG. 2 shows the IEs. Especially, in the information shown in FIG. 2, MAC-Mainconfig, Physical config dedicate, and bearer setting information such as drb-ToaddModList included in the underlined "radioResourceConfigDedicated" are information necessary for performing data transmission and reception, and are included in default configuration information (section 6.3.2 of 3GPP TS36.331 V11.5.0). FIG. 3 shows the information by underlining them.

Each user apparatus UE may hold only one set of default configuration information or may hold a plurality of sets of the information. In the present embodiment, each user apparatus UE holds a plurality of sets of default configuration information. To hold a plurality of sets of default configuration information may mean to hold a plurality of sets of a plurality of parameter values included in an item of configuration (example: Physical config dedicate), or may mean to have a plurality of parameter values for each detailed item in the item of configuration, or may mean a combination of these.

For example, to make the explanation to be easily understood, it is assumed that a plurality of sets of parameter values of "configuration A" are held as default configuration information. Then, in the present embodiment, an index is assigned to each set. The index is defined beforehand, and each user apparatus UE can identify content of the set by the index value.

For example, each user apparatus UE holds 10 types of sets of "configuration A". The 10 types of sets are assigned indexes of 1-10, so that, when a user apparatus UE receives "1" as configuration information for use from another user apparatus UE, the user apparatus UE that receives the information can ascertain that the other user apparatus UE uses a configuration corresponding to "1". FIG. 4 shows an example of default configuration information held in the user apparatus UE in such a form.

Also, for example, in a case where each user apparatus UE can use "configuration A" and "configuration B" as default configurations, when notifying a configuration, the user apparatus UE may notify of a combination of a name of the configuration ("configuration A" and the like) and an index corresponding to a set of values, or may notify of an index indicating the whole of "configuration A" and "configuration B". By the way, it is possible to interpret "combination of the name of configuration and the index" as an index. Also, in a case where a configuration for use corresponds to a plurality of indexes, the user apparatus UE may notify of the plurality of indexes. By the way, it is not essential to use an index. Default configuration information (parameter value and the like) as it is may be transmitted and received.

Each user apparatus UE that performs D2D communication transmits a discovery signal by including the index in the discovery signal, for example. The index may be transmitted by a signal other than the discovery signal.

The default configuration information is set by being embedded when the terminal is shipped, for example. In this case, it is assumed that the default configuration information is specified in a specification, and cannot be changed. Also, default configuration information may be sent from the base station eNB by a signaling at an arbitrary timing such as ATTACH timing and the like when the user apparatus UE is in cell coverage, so that the user apparatus UE may hold the notified information as default configuration information. The default configuration information by signaling may be transmitted by any layer such as RRC and MAC.

It is not essential that default configuration information held by each user apparatus UE is the same between user apparatuses UE. For example, it is possible that a user apparatus UE has configuration information corresponding to indexes of "1" and "2", and another user apparatus UE holds configuration information corresponding to indexes of "3" and "4". As to which information to set to a user apparatus UE as default configuration information, it can be considered that it is determined according to capability and usage and the like of the user apparatus UE.

(Operation Example of the System)

Next, basic operation examples of the system in the present embodiment are described with reference to FIGS. 5 and 6.

<Operation Example 1>

Figure 6:
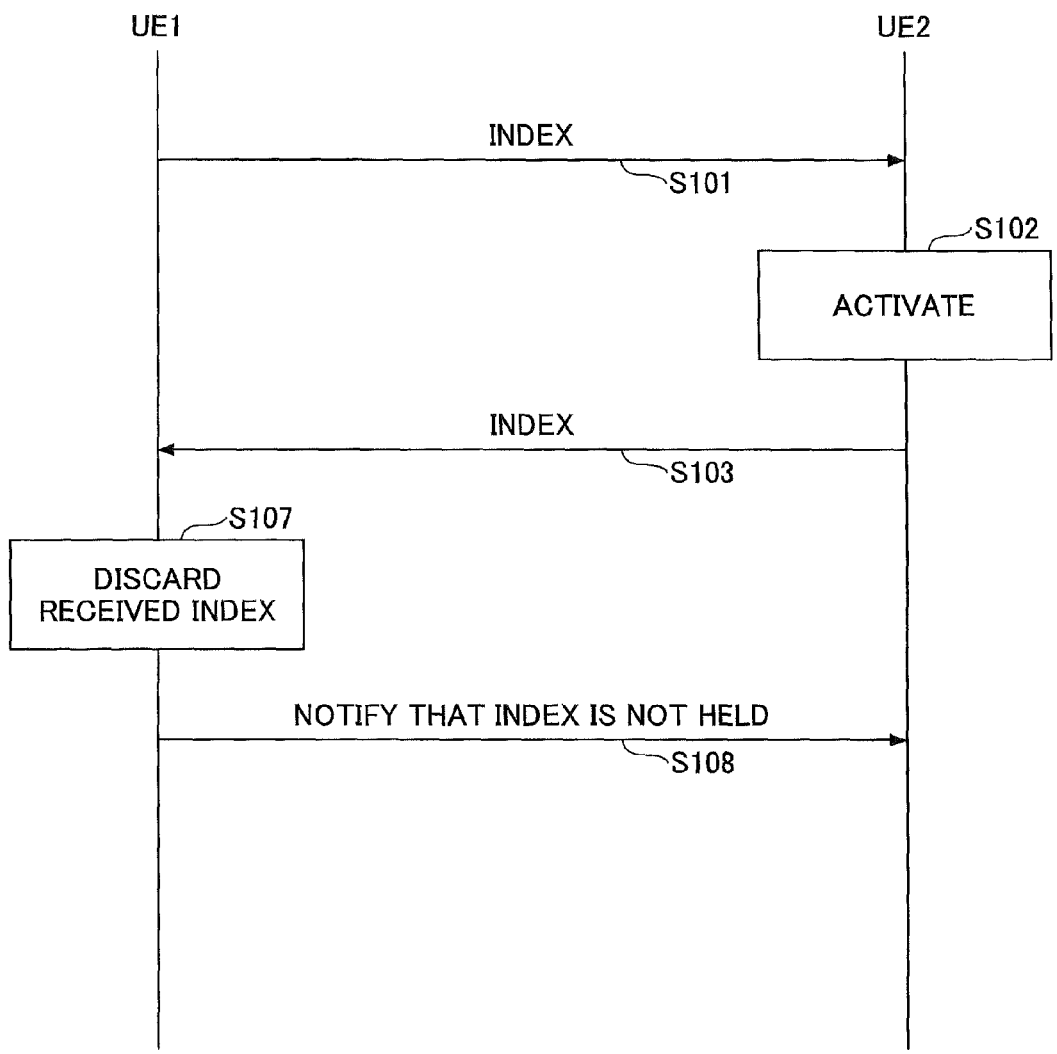
FIG. 6 is a sequence diagram for explaining an operation example 2.

As shown in FIG. 5, each of the user apparatus UE1 and the user apparatus UE2 transmits an index of a default configuration for use by itself, and receives an index from the other party (step 101, step 103). The received index is stored in a storage unit. The transmission of the index may be performed by including the index in the discovery signal. In a case where the user apparatus UE holds a plurality of sets of default configurations, which set to use by the user apparatus UE may be configured fixedly or may be selected according to an application used for D2D communication.

In a case where the communication partner of D2D is not yet determined, transmission of the index is performed by broadcasting. On the other hand, in a case where the communication partner of D2D has been determined, transmission of the index may be performed individually to the communication partner.

Also, transmission of an index by the user apparatus UE may be performed at a timing of start of D2D communication in the user apparatus UE. In FIG. 5, it is assumed that both of the user apparatuses UE1 and UE2 are in a state after D2D communication start.

The start timing of D2D communication in the user apparatus UE is a time when an operation for instructing start of D2D communication is performed by a user on the user apparatus UE, for example. More specifically, for example, this is when an application (example: disaster message board) that uses D2D communication is launched, when emergency call origination (SOS and the like) is performed, or the like.

Also, the user apparatus UE may regard the time when detecting that the user apparatus UE becomes out-of-cell coverage to be a start timing of D2D communication. Also, the user apparatus UE may regard, to be a start timing of D2D communication, the time when detecting reception of a D2D discovery signal, the time when detecting reception of a D2D discovery signal and when there is a D2D communication start instruction from a user, or the like.

Further, a time when being instructed to perform D2D communication from the base station eNB may be regarded as a start timing of D2D communication. For example, when the base station eNB detects congestion of a radio interface between eNB and UE, or detects congestion in a core network, the base station eNB instructs the user apparatus UE to perform D2D communication so as to be able to offload traffic to a neighbor user apparatus UE.

In FIG. 5, each of the user apparatuses UE1 and UE2 that receives an index activates a default configuration for use by itself (step 102, step 104). To activate a default configuration means, for example, to read a set of parameters of the default configuration for use from a storage unit and to provide the parameters to a functional unit (which may be software) that requires the parameters so as to enable the functional unit that requires the parameters to use the parameters. To activate a default configuration may be referred to as "to set a default configuration".

The timing for activating the default configuration for use by itself is not limited to the above-mentioned example. For example, the default configuration may be activated at a timing corresponding to the above-mentioned D2D communication start timing. Also, in a case where data communication is not performed for a predetermined period after a default configuration is activated, the user apparatus UE may deactivate the default configuration. Also, for example, the default configuration may be deactivated at an end (disconnection) of D2D communication as a trigger or at an end of D2D application as a trigger.

In FIG. 5, based on the activated configuration, connection setup processing (connection setup) is performed between the user apparatus UE1 and the user apparatus UE2 (step 105) to establish a D2D communication route so as to perform D2D communication (step 106).

In the above-mentioned example, operation for exchanging indexes of default configuration for use by itself is performed. However, the user apparatus UE2 may not transmit an index of itself to the user apparatus UE1 by receiving an index from the user apparatus UE1 first, and determining to use a default configuration of the received index so as to perform activation.

As mentioned above, default configurations of the same index can be used between user apparatuses UE that perform D2D communication. However, it is not essential to use default configurations of the same index between user apparatuses UE that perform D2D communication. Indexes may be different between user apparatuses UE as long as D2D communication can be performed.

<Operation Example 2>

It can be considered that there is a case where the user apparatus UE receives an index that the user apparatus UE does not hold from another apparatus. With reference to FIG. 6, an operation example is described in a case where the user apparatus UE1 does not hold an index received from the user apparatus UE2.

Like the case of FIG. 5, the user apparatus UE1 transmits an index for use by the user apparatus UE1, and the user apparatus UE2 receives the index (step 101). The user apparatus UE2 holds the index received from the user apparatus UE1 so that the user apparatus UE2 can interpret the configuration corresponding to the index. Thus, the user apparatus UE2 determines that it can communicate with the user apparatus UE1 and activates the configuration of the user apparatus UE2 (step 102).

The user apparatus UE2 transmits an index for use by the user apparatus UE2, and the user apparatus UE1 receives the index (step 103). When the user apparatus UE1 confirms that the index received from the user apparatus UE2 does not exist in indexes of default configurations held by the user apparatus UE1, the user apparatus UE1 discards the index received from the user apparatus UE2 (step 107). The reason is that the user apparatus UE1 cannot interpret the configuration of the index received from the user apparatus UE2 so that it is unnecessary to hold the index.

Also, the user apparatus UE1 may transmit, to the user apparatus UE2, a notification indicating that the user apparatus UE1 does not hold the index received from the user apparatus UE2 (step 108). Accordingly, the user apparatus UE2 can ascertain that the user apparatus UE2 cannot perform D2D communication with the user apparatus UE1, so that an operation to transmit a D2D communication connection request to the user apparatus UE1 can be avoided.

<Operation Example 3>

In the present embodiment, each user apparatus UE can hold two pieces of information which are default configuration information and configuration information (notified as information which is not default configuration information) notified from the base station eNB. In the present embodiment, basically, when the user apparatus UE is in-coverage of the base station eNB, the user apparatus UE performs setting according to the configuration instructed from the base station eNB. However, the user apparatus UE may change the setting to the default configuration based on an instruction (broadcasting/dedicated) from the base station eNB. The instruction from the base station eNB includes an index of a default configuration, so that the user apparatus UE that receives the instruction may perform setting to the default configuration of the received index.

Also, when the user apparatus UE detects that a state changes from a state where the user apparatus UE is in-coverage of the base station eNB to a state where the user apparatus UE is out-of-coverage of the base station eNB, the user apparatus UE may autonomously change the configuration for use to the default configuration.

Also, in a case where an index of a configuration is notified (broadcasted) from a user apparatus UE that is in-coverage of the base station eNB to a user apparatus UE that is out-of-coverage of the base station eNB, it is desirable that the user apparatus UE that is out-of-coverage of the base station eNB performs configuration setting of itself in accordance with the received index. The reason is that, since there is a high possibility that the configuration of the user apparatus UE that is in-coverage of the base station eNB is one specified from the base station eNB, it is desirable from the viewpoint of call control that the user apparatus UE that is out-of-coverage sets the configuration in accordance with the configuration of the user apparatus UE that is in-coverage. When the user apparatus UE that is in-coverage of the base station eNB transmits an index received from the base station eNB, the user apparatus UE may transmit the index by adding information indicating that it was received from the base station eNB.

An operation example 3 based on the above-mentioned viewpoint is described with reference to the sequence diagram of FIG. 7. After D2D communication ends in step 106, the user apparatus UE1 enters in-coverage of the base station eNB (step 201).

The user apparatus UE1 receives configuration information transmitted from the base station eNB (step 202). The configuration information may be transmitted as an index held by the user apparatus UE1. It is transmitted as an index in the present embodiment.

The user apparatus UE1 performs setting (activate) of the configuration received from the base station eNB (step 203), and starts communication (step 204). After that, communication ends (step 205).

Figure 7:
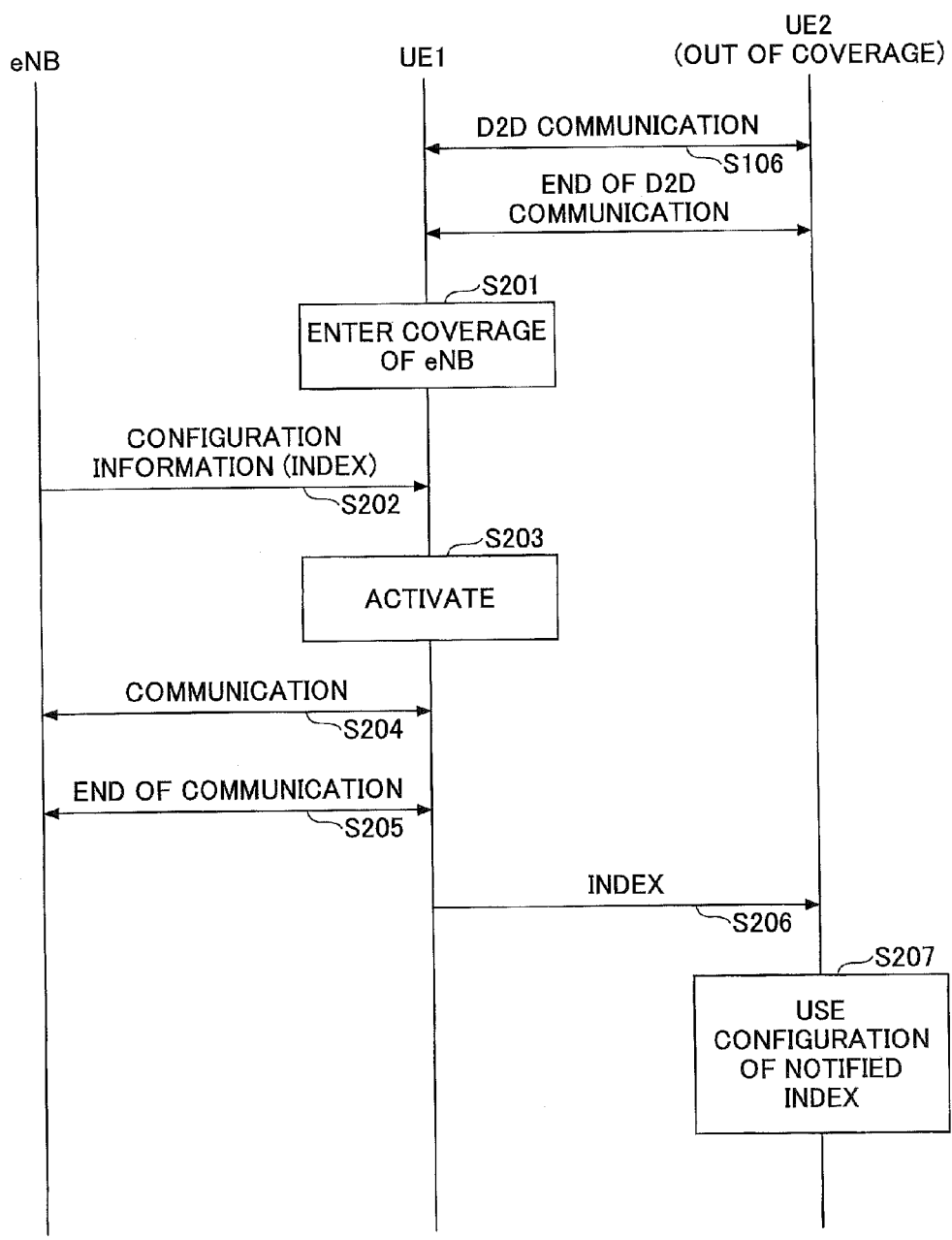
FIG. 7 is a sequence diagram for explaining an operation example 3.

In the example of FIG. 7, in step 206, the user apparatus UE1 that is in-coverage transmits the configuration information (index) received from the base station eNB to the user apparatus UE2 that is out-of-coverage (step 206). The user apparatus UE2 sets the configuration corresponding to the index (step 207).

(Apparatus Configuration, Process Flow)

Figure 8:
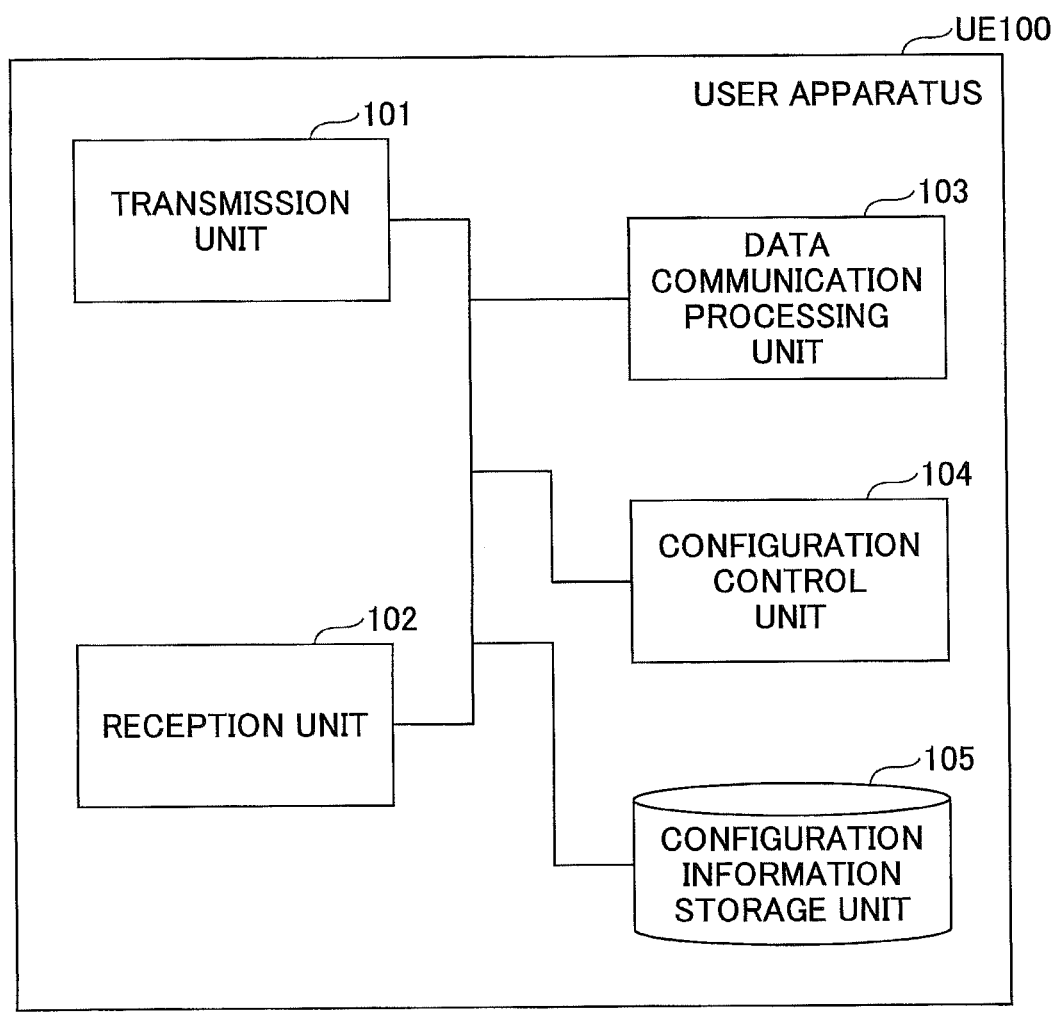
FIG. 8 is a functional block diagram of a user apparatus UE100 of an embodiment of the present invention.

FIG. 8 shows, a functional block diagram of the user apparatus UE100 of the present embodiment. In the present embodiment, the user apparatuses UE1 and UE2 have the same configuration, so that the user apparatus UE100 can be used any of the user apparatuses UE1 and UE2.

As shown in FIG. 8, the user apparatus UE100 of the present embodiment includes a transmission unit 101, a reception unit 102, a data communication processing unit 103, a configuration control unit 104 and a configuration information storage unit 105.

The transmission unit 101 and the reception unit 102 of the user apparatus shown in FIG. 8 may respectively serve as a transmission function and a reception function for D2D communication, and a transmission function and a reception function for performing communication via a base station eNB, or the user apparatus UE100 may be further provided with a transmission unit and a reception unit for performing communication via the base station eNB separately from the transmission unit 101 and the reception unit 102 for D2D communication. The configuration shown in FIG. 8 only shows functional units related to embodiments of the present invention, and the user apparatus UE 100 includes functions, not shown in the figure, for realizing D2D communication, communication with the base station eNB and the like.

The transmission unit 101 transmits a signal to another apparatus by radio communication, and the reception unit 102 receives a signal from another apparatus by radio communication. In the present embodiment, each of the transmission unit 101 and the reception unit 102 includes a function for performing communication with LTE radio interface protocols (layer 1, layer 2 and layer 3).

The data communication processing unit 103 is a functional unit corresponding to an application for performing data transmission and reception by D2D communication. The configuration control unit 104 performs control on configurations such as selection and setting of configurations and transmission/reception of configuration information (index) and the like. The configuration information storage unit 105 stores default configuration information (example: FIG. 4) and normal configuration information (which is not default configuration) received from the base station eNB, and the like.

Figure 9:
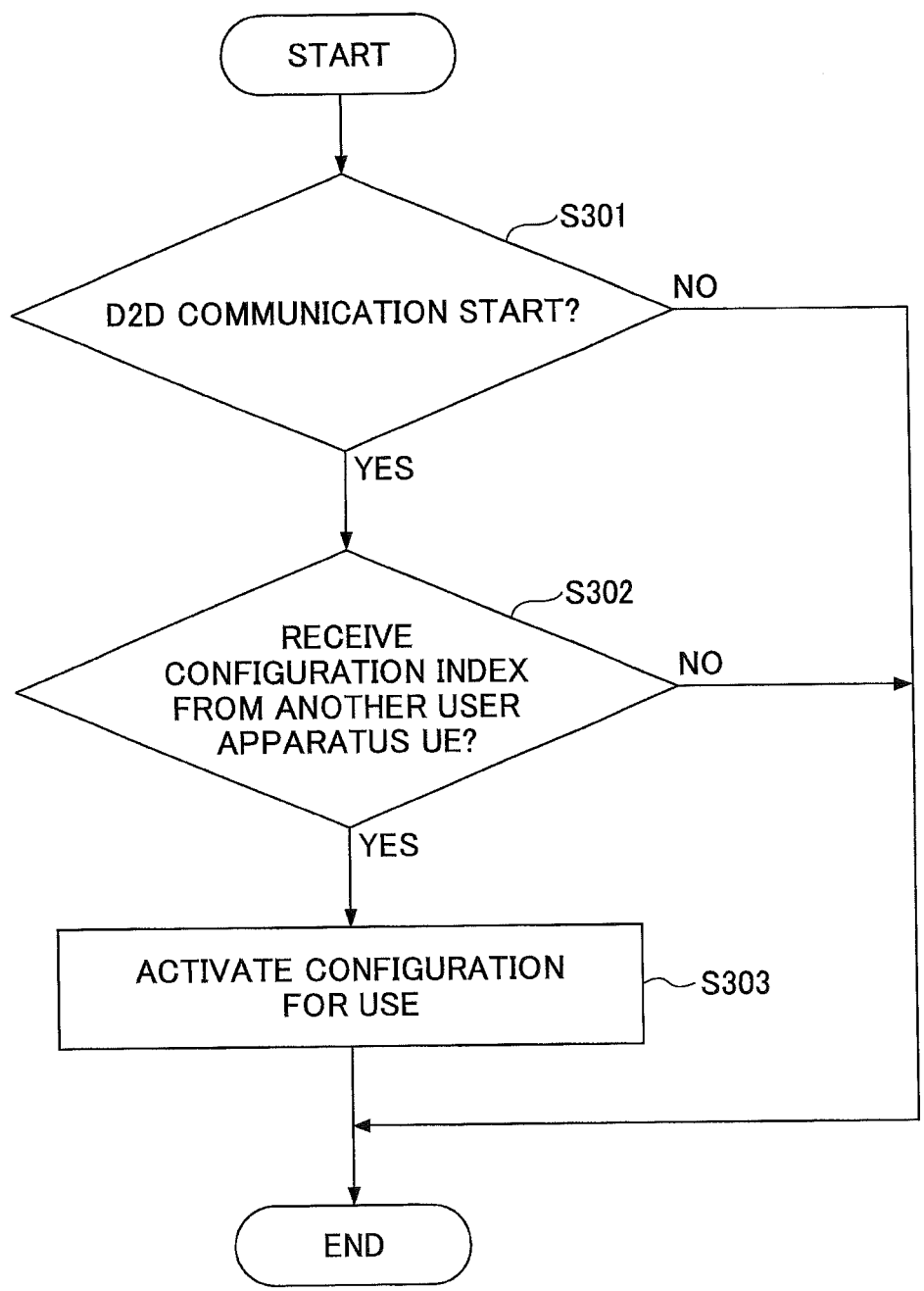
FIG. 9 is a flowchart showing an operation example of the user apparatus UE100.

With reference to the flowchart shown in FIG. 9, an example of operation of the user apparatus UE100 is described. The configuration control unit 104 of the user apparatus UE100 determines whether D2D communication starts or not by determining whether the data communication processing unit 103 as a D2D communication application starts operation or not (step 301). In a case where D2D communication has been started (Yes in step 301), the configuration control unit 104 determines whether an index of a configuration is received from another user apparatus UE via the reception unit 102 (step 302). When the configuration control unit 104 receives an index of a configuration from another user apparatus UE via the reception unit 102, the configuration control unit 104 confirms that configuration information of the index is held by referring to the configuration information storage unit 105, and activates the configuration for use by itself (step 303). The configuration is a configuration of an index received in step 302, for example. However, as described before, there is also a case where the configuration for use by itself is a configuration of an index different from an index received from the other user apparatus UE.

(Summary of Embodiment, Effect and the Like)

According to the present embodiment, there is provided a communication apparatus configured to perform communication by radio with another communication apparatus based on a setting by configuration information, including:

a storage unit configured to hold default configuration information;

a transmission unit configured to transmit default configuration information held in the storage unit to the other communication apparatus;

a reception unit configured to receive default configuration information from the other communication apparatus; and a control unit configured to perform setting for performing communication by radio with the other communication apparatus by the default configuration information.

The communication apparatus is a user apparatus UE, for example. According to the above-mentioned configuration, even when the communication apparatus is not in-coverage of a base station, setting of configuration can be performed so that D2D communication can be performed.

Each piece of the default configuration information is an index corresponding to content of a default configuration, for example. By using the index, it becomes possible to perform transmission and reception, and storing of default configuration information with small amount of information.

In a case where the default configuration information received by the reception unit is not held in the storage unit, the control unit can discard the received default configuration information, and notify the other communication apparatus that the default configuration information is not held. Accordingly, the other communication apparatus can avoid transmitting a connection request of D2D uselessly.

Although the default configuration information held in the storage unit may be information pre-stored when the apparatus is shipped, the default configuration information may be also information received from a base station that communicates with the communication apparatus. By receiving from a base station, update of default configuration information can be easily realized.

Communication performed between the communication apparatus and the other communication apparatus is D2D communication, and, for example, the transmission unit transmits a discovery signal including default configuration information. By transmitting a discovery signal by including default configuration information in the discovery signal, signal transmission and reception can be reduced in D2D communication, and radio connection of D2D communication can be started quickly.

When the control unit detects that the communication apparatus is not in cell coverage of a base station, the control unit can perform setting by default configuration information. Accordingly, detecting that the communication apparatus is not in-cell coverage triggers performing setting by default configuration information, so that D2D communication in our-of-cell coverage can be performed smoothly.

When the control unit detects that an application that uses D2D communication is launched in the communication apparatus, the control unit may perform setting by default configuration information. Accordingly, D2D communication can be performed smoothly when a user wants to use a desired application.

Also, according to the present embodiment, there is provided a configuration control method executed by a communication apparatus configured to perform communication by radio with another communication apparatus based on a setting by configuration information, wherein the communication apparatus is provided with a storage unit configured to hold default configuration information, including:

a step of transmitting default configuration information held in the storage unit to the other communication apparatus, and receiving default configuration information from the other communication apparatus; and a step of performing setting for performing communication by radio with the other communication apparatus by using the default configuration information.

In the above, the present invention has been explained while referring to the specific embodiments. However, the disclosed invention is not limited to the embodiments. Those skilled in the art will conceive of various modified examples, corrected examples, alternative examples, substituted examples, and the like. While specific numerical value examples are used to facilitate understanding of the present invention, such numerical values are merely examples, and any appropriate value may be used unless specified otherwise. Classification into each item in the description is not essential in the present invention, and features described in two or more items may be combined and used as necessary. Subject matter described in an item may be applied to subject matter described in another item (provided that they do not contradict).

It is not always true that the boundaries of the functional units or the processing units in the functional block diagram correspond to boundaries of physical components. The operations by the plural functional units may be physically performed by a single component. Alternatively, the operations by the single functional unit may be physically performed by plural components.

For convenience of explanation, the user apparatus UE has been explained by using functional block diagrams. However, such an apparatus may be implemented in hardware, software, or a combination thereof.

The software that operates, in accordance with the present invention, by a processor (CPU) provided in the user apparatus UE may be stored in any proper storage medium such as a Random Access Memory (RAM), a flash memory, a Read Only Memory (ROM), an EPROM, an EEPROM, a register, a hard disk (HDD), a removable disk, a CD-ROM, a database, a server and the like.

The present invention is not limited to the above-mentioned embodiment and is intended to include various variations, modifications, alterations, substitutions and so on without departing from the spirit of the present invention.

The present international application claims priority based on Japanese patent application No. 2013-227527, filed in the JPO on Oct. 31, 2013, and the entire contents of the Japanese patent application No. 2013-227527 is incorporated herein by reference.

DESCRIPTION OF REFERENCE SIGNS

UE user apparatus
eNB base station
101 transmission unit
102 reception unit
103 data communication processing unit
104 configuration control unit
105 configuration information storage unit

The invention claimed is:

1. A user apparatus configured to perform communication by radio with another user apparatus based on a setting by configuration information, wherein the other user apparatus is out-of-coverage of a base station, and the user apparatus is in-coverage of the base station, the user apparatus comprising:

a storage unit configured to hold default configuration information; and a transmission unit configured to transmit the default configuration information held in the storage unit by broadcasting, wherein, in the other user apparatus that has received the default configuration information, setting for performing communication by radio with the user apparatus is performed by the default configuration information, wherein the default configuration information held in the storage unit is information received from the base station that communicates with the user apparatus.

2. The user apparatus as claimed in claim 1, wherein the default configuration information is an index corresponding to content of a default configuration.

3. The user apparatus as claimed in claim 2, wherein communication performed between the user apparatus and the other user apparatus is D2D communication, and the transmission unit transmits a discovery signal including the default configuration information.

4. The user apparatus as claimed in claim 1, wherein communication performed between the user apparatus and the other user apparatus is D2D communication, and the transmission unit transmits a discovery signal including the default configuration information.

5. A configuration control method executed by a user apparatus configured to perform communication by radio with another user apparatus based on a setting by configuration information, wherein the other user apparatus is out-of-coverage of a base station, and the user apparatus is in-coverage of the base station, and wherein the user apparatus is provided with a storage unit configured to hold default configuration information, the configuration control method comprising:

transmitting the default configuration information held in the storage unit by broadcasting, wherein, in the other user apparatus that has received the default configuration information, setting for performing communication by radio with the user apparatus is performed by using the default configuration information, wherein the default configuration information held in the storage unit is information received from the base station that communicates with the user apparatus.

* * * * *